Jan. 29, 1963 E. W. FLETCHER 3,075,698

COSTING AND TIMING DEVICE

Filed Sept. 11, 1959 4 Sheets-Sheet 1

INVENTOR.

EWAN W. FLETCHER

BY Paul M. Grist

ATTORNEY

Jan. 29, 1963

E. W. FLETCHER 3,075,698

COSTING AND TIMING DEVICE

Filed Sept. 11, 1959

4 Sheets-Sheet 2

INVENTOR.
EWAN W. FLETCHER
BY Paul M. Gist
ATTORNEY

Jan. 29, 1963 E. W. FLETCHER 3,075,698

COSTING AND TIMING DEVICE

Filed Sept. 11, 1959 4 Sheets-Sheet 3

INVENTOR.

EWAN W. FLETCHER

BY Paul M. Craig

ATTORNEY

INVENTOR.
EWAN W. FLETCHER
BY Paul M. Gist
ATTORNEY

United States Patent Office 3,075,698

Patented Jan. 29, 1963

3,075,698

COSTING AND TIMING DEVICE

Ewan W. Fletcher, Arlington, Mass., assignor to Herbert C. Lee., Belmont, Mass.

Filed Sept. 11, 1959, Ser. No. 839,317
11 Claims. (Cl. 235—92)

The present invention relates to apparatus for measuring and/or recording the accumulation of one variable as a function of one or more other variables, and particularly to a combined timing and costing apparatus capable of indicating and recording the time length of a telephone call or the like throughout the toll connection period, as well as the integrated cost at any instant during this period.

The principal object of this invention is to provide apparatus capable of indicating and/or recording the accumulation of one variable as a function of one or more other variables, as well as the accumulation of one of said other variables.

Another object of this invention is to provide a combined timing and costing apparatus capable of indicating and recording the total cost and time consumed of a time-cost function involving one or more variables.

Another object of this inventoon is to provide a combined timing and costing apparatus for indicating and recording the total time and cost of a long-distance telephone conversation or the like involving variables such as base rate, initial time for base rate and overtime charge per minute.

Another object of this invention is to provide such an apparatus that is capable of functioning as a result of the operation of pulse forming apparatus that is connected to, and actuates, a counting device.

Another object of this invention is to provide such an apparatus that is capable of producing a plurality of groups of different predetermined pulses per minute in combination with a presettable device capable of integrating one or more of the groups of different predetermined pulses per minute to produce a still larger number of groups of predetermined pulses per minute.

In one aspect of the invention, a rotatable disk or the like may be provided with a plurality of concentrically arranged groups of contacts, each group including a predetermined different number of contacts. The disk may be rotated at an exact r.p.m., and there may be provided a separate, non-rotatable contact-making brush for each group of contacts as well as a separate brush for impressing a direct current voltage on all of the contacts within the concentrically arranged groups.

In another aspect of the invention, a stationary disk or the like may be provided with a plurality of concentrically arranged groups of contacts and a presettable contact arm which will, when preset, connect predetermined of the non-rotatable brushes associated with the rotatable disk in series relation with an electromechanical cost counting device such as a magnetically operated Veeder-Root counter or the like.

In still another aspect of the invention, one of the stationary brushes that receives 60 pulses per minute may be connectable to an electromechanical time counting device such as a magnetically operated Veeder-Root counter or the like.

In another aspect of the invention, the Veeder-Root counters may include embossed numerals on their digital disks, and a movable platen may be provided for receiving a record card so that the accumulated time and cost for an operation of the apparatus may be permanently recorded.

In another aspect of the invention, an electronic pulse forming network may be combined with a group of astable multivibrators in such a manner that the pulse forming network produces a predetermined number of spiked pulses per second which acts as a reference for influencing the output pulses per minute from various of the multivibrators, the parameters of the latter of which being such as to produce different predetermined flip-flop actions.

In still another aspect of the invention, the outputs from certain of the various astable multivibrators may be fed to a plurality of bistable multivibrators for producing a larger number of groups of pulses per minute than was produced by the astable multivibrators.

A stationary disk or the like may be provided with a plurality of concentrically arranged groups of contacts and a presettable contact arm which will, when preset, render effective predetermined groups of the output pulses per minute from the astable and bistable multivibrators to energize beam switching and numerical readout tubes.

The above, other objects and novel features of the invention will become apparent from the following specification and accompanying drawings which are merely exemplary.

Figure 1:
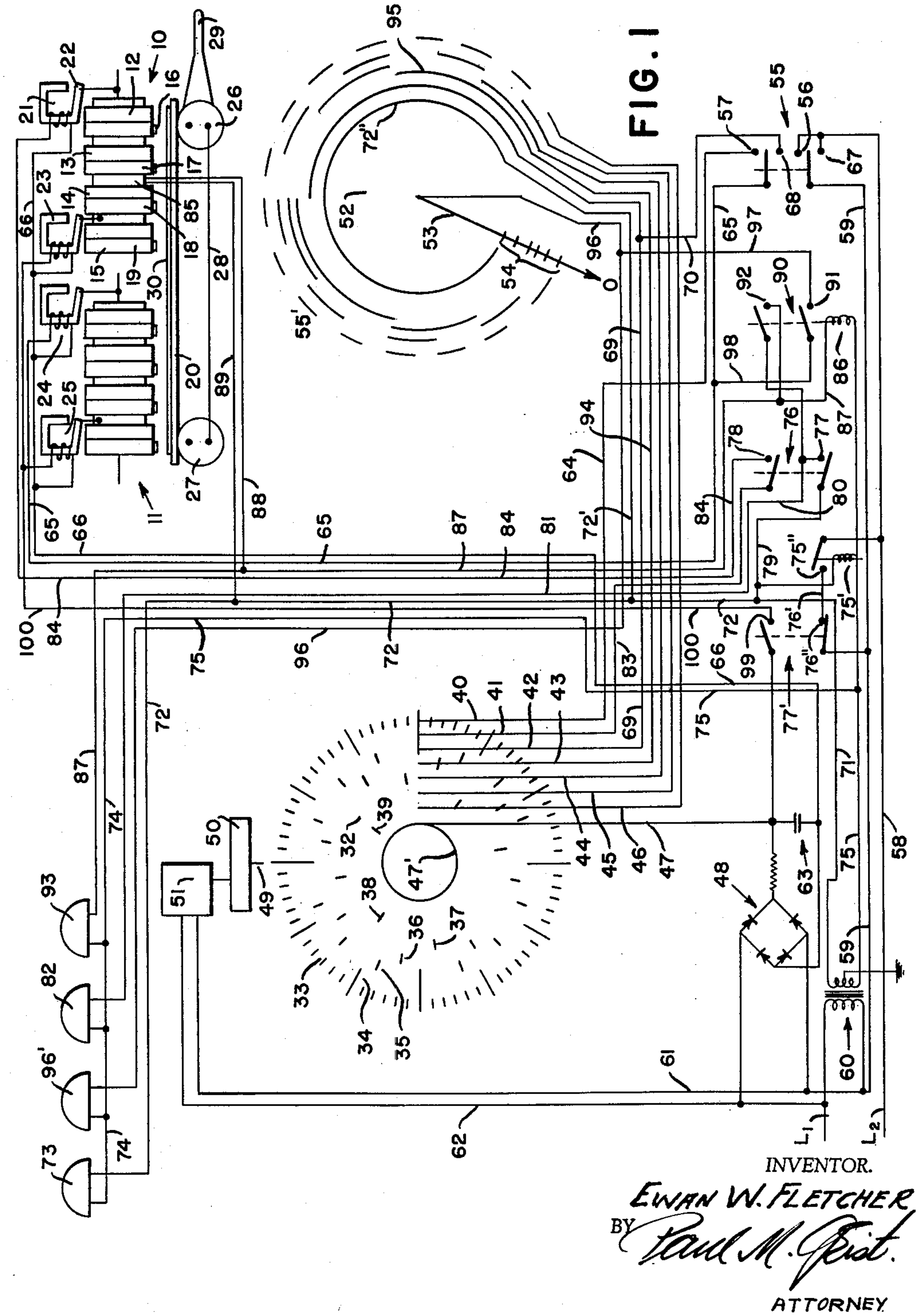
FIG. 1 is a schematic diagram of an electrical circuit to which the principles of the invention have been applied.

Referring to FIG. 1, the principles of the invention are shown as applied to a cost-time device including a time counter 10 and a cost counter 11. The counter 10 may include a Veeder-Root type of counter including digit wheels 12, 13, 14 and 15 having numerals from 0–9 on their peripheries. Corresponding digit wheels 16, 17, 18 and 19 may be fixed respectively to wheels 12 to 15 and may include numerals 0–9 on their peripheries in raised or embossed form. The numerals on wheels 16 to 19 may be 90° out of phase with the numerals on wheels 12 to 15 so that when a value appears in a horizontal window, the same value on wheels 16 to 19 is 90° displaced from the window and at a location spaced a slight distance directly above a platen 20 for a purpose to be described later. The counter 11 is identical with the counter 12.

A magnetic indexing device 21 may be connected to the input of the drive shaft of counter 10 and may include a pivotally mounted arm 22 that may be connected to the input shaft of counter 10 by a ratchet mechanism (not shown) in a known manner. Each time the magnetic device 21 is energized, the input shaft of counter 10 is indexed one digit.

A magnetic indexing device 23 may be connected to the counter 10 in a known manner for resetting the counter 10 to zero when it is energized.

Magnetic indexing devices 24 and 25 may be connected to the counter 11 for operating it in the same way that devices 21 and 23 operate counter 10.

The platen 20 may be supported on eccentric wheels 26 and 27 which are fixed to a shaft 28 to which a hand lever 29 may be connected. Accordingly, placing a card 30 on the top of platen 20 and pressing lever 29 downwardly will cause the values on counters 10 and 11 appearing in the window to be impressed on the card 30 for record purposes.

A pulsing device may include an insulating disk 32 having concentrically arranged circles of contacts and a brush for each circle of contacts. In the embodiment disclosed, there may be seven circles of contacts 33, 34, 35, 36, 37, 38 and 39. The circle 33 may include 72 equally spaced contacts adapted to complete a circuit each time one of the contacts engages a brush 40. The circle 34 may include 12 equally spaced contacts adapted to complete a circuit each time one of them engages a brush 41.

In a like manner circle 35 includes 16 contacts that cooperate with a brush 42; circle 36 includes eight contacts that cooperate with a brush 43; circle 37 includes four contacts that cooperate with a brush 44; circle 38 includes two contacts that cooperate with a brush 45; and circle 39 includes one contact that cooperates with a brush 46. A brush 47 cooperates with a slip ring 47′ to feed direct current voltage to all of the contacts from a full wave rectifier 48 as will be described later.

The pulsing disk 32 is connected to a shaft 49 that leads to a gear reduction unit 50 driven by a synchronous electric motor 51. The gear reduction unit 50 causes the disk 32 to be rotated at exactly 5 r.p.m.

From the foregoing it is evident that when motor 50 is energized and direct current voltage is supplied to brush 46, brush 40 will receive 360 voltage pulses per minute; brush 41 will receive 60 p.p.m.; brush 42 will receive 80 p.p.m.; brush 43 will receive 40 p.p.m.; brush 44 will receive 20 p.p.m.; brush 45 will receive 10 p.p.m.; and brush 46 will receive 5 p.p.m.

A stationary disk 52, representing overtime charge, may include a series of concentrically arranged contacts so arranged as to cooperate with a contact arm 53. The arm 53 may include a contact 54 for each circle of contacts on disk 52. In the embodiment disclosed, there are shown six concentric circles of contacts and six contacts 54 on arm 53. By placing the arm in various rotary positions, combinations of the pulse forming contacts on disk 32 are combined. Thus, placing the arm 53 in a rotary position, represented by 55′, about the periphery of disk 52 will connect pulsing circuits including brushes 43, 45 and 46 representing a combination of 55 p.p.m. from disk 32. The arrangement of the overlapping contacts on disk 52 and the circuits of the pulsing disk 32 are so arranged that only one pulse at a time is transmitted through the circuitry.

Each electrical pulse of the circuit including brush 41 is adapted to energize the magnetic indexing device 21, and each pulse of the circuits combined by the setting of arm 53 is adapted to energize the magnetic device 24. In order to better understand the specific circuitry, a description of a particular arrangement will be given.

Let it be assumed that the charge for the first three minutes is $2.25 and that the overtime charge is 55 cents per minute after the three minutes have elapsed. With the apparatus in the condition shown in FIG. 1, movement of a switch 55 to the position closing contacts 56 and 57 thereof causes current to flow from $L_2$ through line 58, contact 56, line 59, through the primary of a transformer 60, thence to line $L_1$. The transformer 60 is adapted to supply 6.3 volts A.C., center tap, at the terminals of its secondary. Current also flows from line 59 through line 61 to motor 51, thence through line 62 to $L_1$. The input to the rectifier 48 is also supplied with current since it is in parallel with motor 51. Accordingly, the transformer 60, the rectifier 48 and the motor 51 are energized.

Energizing the rectifier 48 will provide full wave D.C. one-half sine wave pulses to a filter 63, the output of which is smooth direct current of average voltage of 110 volts. This direct current in turn is supplied to the contacts on disk 32 through the slip ring 47′ and brush 47.

Energizing the motor 51 causes disk 32 to be rotated at exactly 5 r.p.m., as previously explained, and 360 p.p.m. will be supplied from disk 32 to magnetic device 24 as follows. Current flows from rectifier 48 through brush 47, slip ring 47′, brush 40, line 64, contact 57 of switch 55, line 65, magnetic device 24, line 66 back to rectifier 48. This causes cost counter 11 to operate rapidly at 360 p.p.m. which it does until the user, after noticing the cost appearing in the window near the given value of $2.25, say at $2.23, moves switch 55 to a position opening contacts 56, 57 and closing contacts 67 and 68. Closing contact 67 maintains the motor 51 energized as well as the rectifier 48 and transformer 60. Closing contact 68 causes pulses from disk 32 to be supplied through brush 42 at a rate of 80 p.p.m., thence through line 69, line 70, contact 68, line 65, magnetic device 24, line 66 to rectifier 48. This causes the cost counter 11 to operate relatively slowly so that the user can easily move switch 55 to the position shown in FIG. 1 when the exact value of $2.25 appears in the window. When switch 55 was initially operated to energize transformer 60, current from its secondary also flowed through line 75, relay coil 75′ and back to the secondary through line 71. Energizing coil 75′ closed contact 75″ which causes current to flow from $L_2$ through contact 75″, line 76′, contact 76″ of switch 77′, thence through line 59, through the transformer 60, the motor 51 and the rectifier 48. This keeps these components energized after switch 55 is moved to the position shown in FIG. 1 when the initial period cost has been set in counter 11.

Energizing the transformer 60 causes current to flow from its secondary through line 71, line 72 to a lamp 73, line 74, line 75, back to the secondary of transformer 60. Accordingly, lamp 73 lights, indicating to the user that the initial period cost has been set in counter 11.

The user then turns arm 53 to a position such that it is aligned with numeral 55′ on the periphery of stationary disk 52. This connects brushes 43, 45 and 46 into a pulsing circuit for integrating the overtime charge of 55 cents per minute after the lapse of the initial preset time of three minutes, as will be explained later. Also, upon movement of arm 53 to the desired position, which in this case is 55 cents, current flows from the secondary of transformer 60, through line 71, line 72, line 72′, contact 72″, arm 53, line 96, lamp 96′, line 74, line 75, back to the secondary of transformer 60. The lighting of lamp 96′ indicates that the overtime rate is being, or has been set on disk 52.

The apparatus of FIG. 1 is now set to function when the proper connection is made to initiate the conversation. When the user begins talking, he moves switch 76 to a position closing contacts 77 and 78. Closing contact 77 causes current to flow from the secondary of transformer 60 through line 71, line 79, contact 77, line 80, line 81, lamp 82, line 74, line 75 to the secondary, thus lighting lamp 82 to indicate the start of the conversation.

Closing contact 78 causes 60 p.p.m. to flow through line 47 from rectifier 48, through brush 41, line 83, contact 78, line 84, magnetic device 21, line 66, back to rectifier 48, thereby operating the counter 10 to indicate the lapse of time in seconds. Should the conversation terminate within the three-minute period, the cost will appear as that previously set on counter 11. However, if the conversation extends beyond this time limit, a switch 85 closes. This may be accomplished by a mechanical presettable device (not shown) associated with the counter 10 which becomes effective upon the arrival of counter 10 at the three-minute interval, or at any other preset interval of time.

Closing switch 85 causes current to flow from the secondary of the transformer 60 through line 75, coil 86, line 87, line 88, switch 85, line 89, line 72, line 71, back to the transformer 60. Accordingly, coil 86 is energized, causing switch 90 to move to a position to close contacts 91 and 92 thereof. Also, closing switch 85 causes current to flow from transformer 60 through line 75, line 74, lamp 93, line 87, line 88, switch 85, line 89, line 72, line 71, back to transformer 60. This lights lamp 93, indicating that the overtime period has begun.

Closing contact 91 causes the pulses generated by disk 32 and flowing through brushes 43, 45 and 46 to energize the magnetic device 24 to add to the preset cost thereon, 55 cents per minute of overtime talking due to the position in which the arm 53 of disk 52 was set. Closing contact 92 holds relay 86 energized through contact 77 after switch 85 opens. Since this circuitry is the same for each brush, only that for brush 43 will be described specifically. Direct current from the rectifier 48 passes through brush 47, slip ring 47', brush 43, line 94, contacts 95, contact 54 on the arm 53 of disk 52, line 96, line 97, contact 91, line 98, line 65, magnetic device 24, line 66, back to rectifier 48. In a like manner pulses from brushes 45 and 46 also energize magnetic device 24 and, as previously explained, no two pulses occur simultaneously so that the sum of 40, 10 and 5 pulses per minute provides the correct overtime charge per minute which is added to the initially set $2.25 for the first three minutes of conversation.

Upon completion of the conversation, the user moves the switch 76 to the position shown in FIG. 1. Opening contact 77 de-energizes lamp 82 and de-energizes relay 86. De-energizing relay 86 opens contact 91, thereby removing the costing pulses from line 65 and consequently from costing counter 11. Open contact 78 disconnects the time counter 10. Accordingly, the accumulated values on the time and costing counters 10 and 11 remain.

Placing a card 30 on the platen 20 and operating the lever 29 makes a permanent record of the time and cost of the call. Data may be applied to the card 30 for indicating the reason for the call and the person called.

Finally, the user moves the switch 77' to a position where contact 76" is opened and contact 99 is closed. Opening contact 76" de-energizes the transformer 60, the rectifier 48 and the motor 51. Closing contact 99 connects the charged condenser of the filter network 63 to the magnetic devices 25 and 23 through lines 100 and 66 so that as it discharges, it actuates resetting devices 101 and 102 associated with the devices 25 and 23, respectively, returning the counters 11 and 10 to zero in a known manner, and the apparatus is then in condition to be used for the next call.

Figure 2:
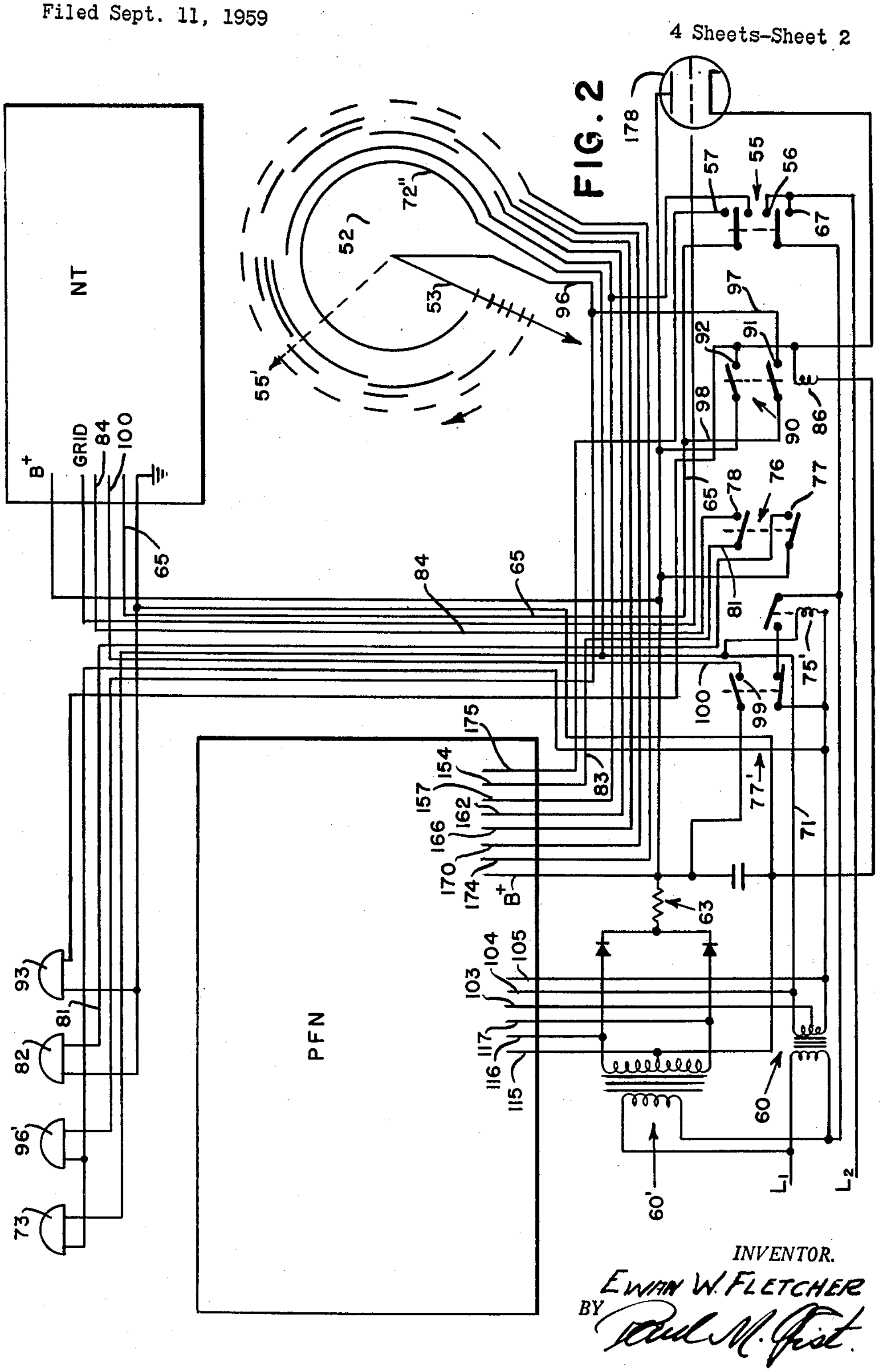
FIG. 2 is a schematic diagram of an electrical circuit of modified form to which the principles of the invention have been applied.
Figure 3:
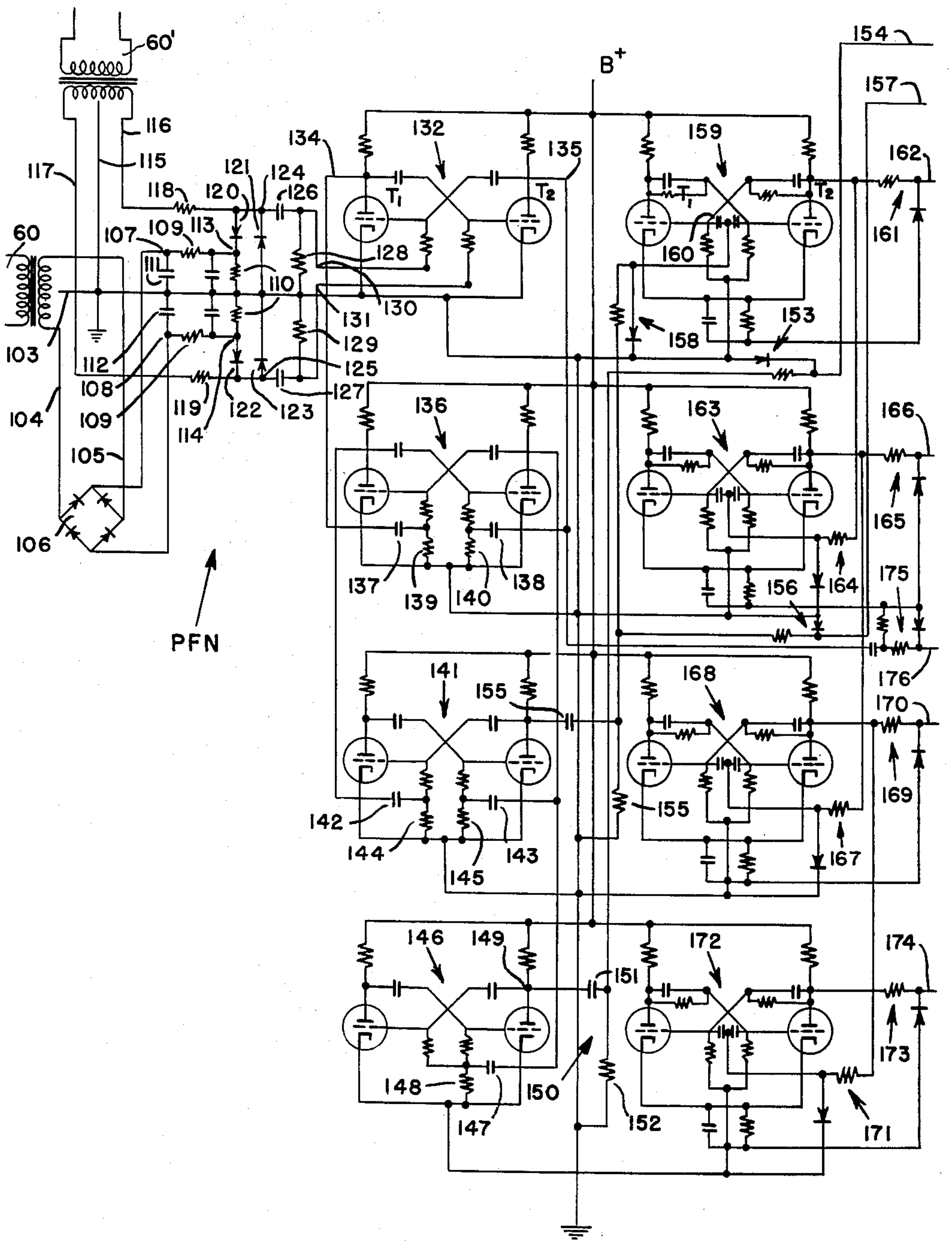
FIG. 3 is a schematic wiring diagram of a portion of the circuitry shown in block form in FIG. 2.
Figure 4:
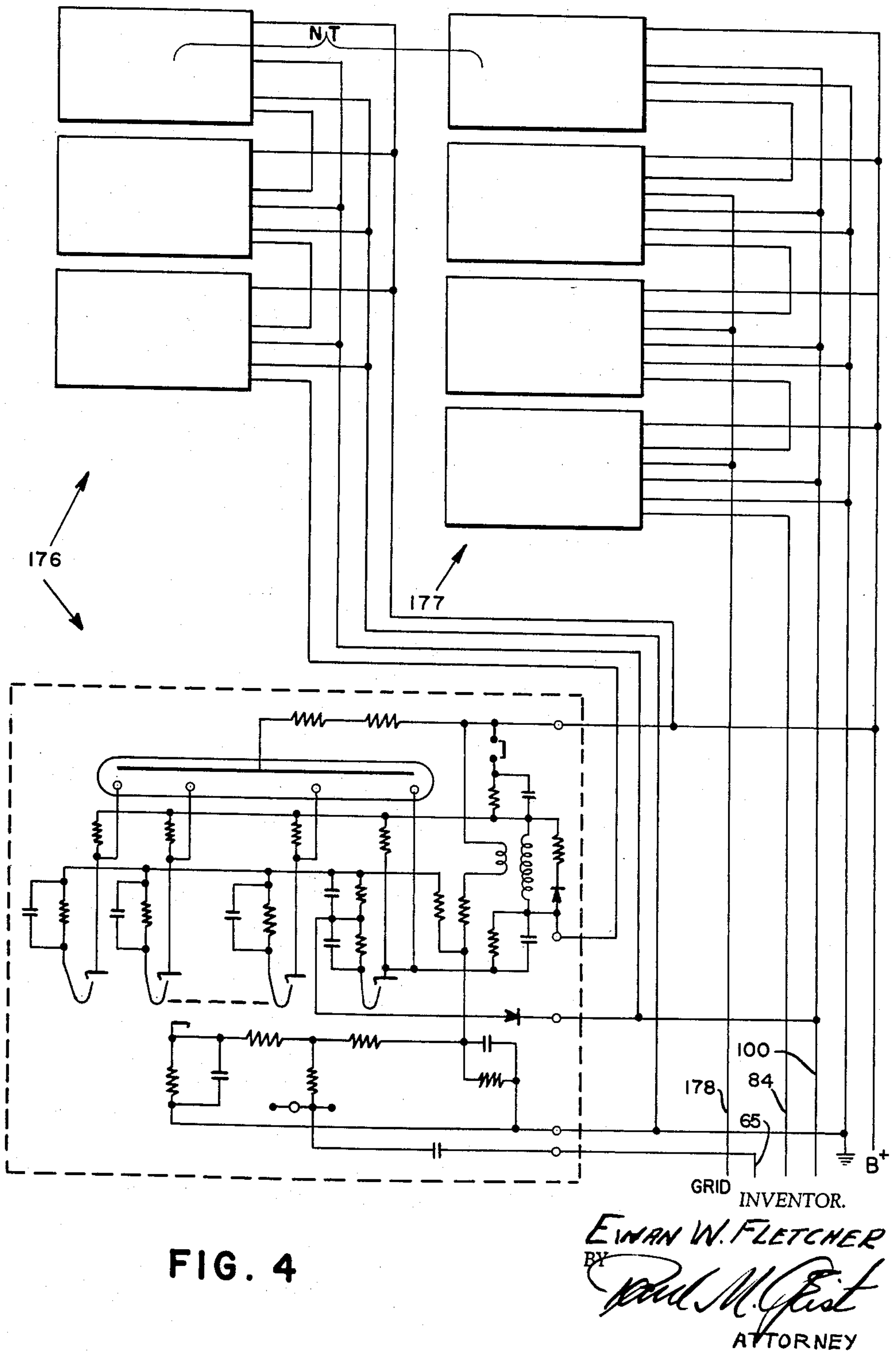
FIG. 4 is a schematic wiring diagram of another portion of the circuitry shown in block form in FIG. 2.

Referring to FIGS. 2, 3 and 4, the principles of the invention are shown as applied to an electronic pulse forming network in combination with a series of astable and bistable multivibrators generally represented by the letters PFN, the output from which is employed to energize vacuum beam switching tubes that may take the place of counting devices 10 and 11, and generally represented by the letters NT.

Referring to FIGS. 2 and 3, transformer 60 may supply 6.3 volts A.C., center tap, to lines 103, 104 and 105, line 103 leading to ground and lines 104 and 105 to a rectifying bridge 106 (FIG. 3) including four 1N34a germanium diodes. The direct current output of the rectifying bridge 106 supplies D.C. one-half sine wave pulses at the rate of 120 per second at points 107 and 108. Those at point 107 are plus and those at point 108 are minus. This voltage is suitably filtered and voltage divided by the 3300 and 1000 ohm resistors 109 and 110 as well as the 8 $\mu$f. capacitors 111 and 112 to produce at points 113 and 114, +1.5 volts and −1.5 volts D.C., respectively, for use as clamping bias voltages.

A transformer 60' may supply 700 volts A.C., center tap, to lines 115, 116 and 117, line 115 leading to ground and lines 116 and 117 connecting to 330K ohm resistors 118 and 119, respectively, thence to clamping diodes 120, 121 and 122, 123. This arrangement generates at terminal 24 a square wave every half cycle to +1.5 volts and returning to ground or zero volts at 60 c.p.s., and at terminal 125 a mirror image of this square wave. Accordingly, there are 60 square waves of one-half cycle duration per second at points 124 and 125.

Symmetrical differentiators including 100 $\mu\mu$f. capacitors 126, 127 and 91K ohm resistors 128 and 129 yield at terminal 130 plus and minus pulses at exactly 1/120 of a second apart; while at terminal 131 identical pulses are yielded except for a sense change.

From the foregoing it is evident that by supplying suitable voltages at 60 c.p.s. to a pulse forming network, a series of alternate plus and minus pulses 1/120 of a second apart in push-pull signal form are provided on two output terminals 130 and 131, and which pulses are balanced with respect to ground.

These push-pull pulses on terminals 130 and 131 may be connected to the grid circuits of tubes $T_1$ and $T_2$, respectively, of an astable multivibrator 132. The parameters of the astable multivibrator 132 are such that it produces a free running flip-flop action at a rate of 675 c.p.m., each cycle of which requires 4/45 of a second. Accordingly, every 1/120 of a second a pulse is injected onto the waveform of the grid voltage of $T_1$ from the pulse forming network and after five such pulses have been injected, or 1/24 of a second after cutoff, the cutoff tube $T_1$ begins to conduct. This instantly drives tube $T_2$ to cutoff and 1/24 of a second later, this tube $T_2$ is caused to conduct and the tube $T_1$ is driven to cutoff. Accordingly, instead of the grid voltage cycle occurring every 4/45 of a second, the injected pulses from the pulse forming network cause the grid voltage cycle to occur exactly every 1/12 of a second, or 12 cycles per second, and consequently 720 cycles per minute in square waveform at points 134 and 135 of multivibrator 132.

The 720 cycles per minute square wave outut from 132 may be fed to the grids of the two tubes of astable multivibrator 136 through differentiating circuits including 100 $\mu\mu$f. capacitors 137, 138 and 91K ohm resistors 139 and 140 to provide spiked waveform pulses every 1/12 of a second. The parameters of multivibrator 136 may be such as to cause a free running flip-flop action of slightly less than 240 cycles per minute, say 200 c.p.m. The injection on the grid waveform of the 720 c.p.m. spiked waveform pulses from multivibrator 132 causes multivibrator 136 to oscillate at a frequency of 240 c.p.m., producing at its output 240 c.p.m. of square waveform.

The 240 c.p.m. of voltage in square waveform from the output of 136 may be fed to the grid circuits of the two tubes of astable multivibrator 141 through differentiating circuits including 100 $\mu\mu$f. capacitors 142, 143 and 91K ohm resistors 144, 145 to provide spiked waveform pulses at 240 c.p.m.

The parameters of the multivibrator 141 may be such that a free running flip-flop action is provided that may be slightly less than 80, say 75 c.p.m. The injection on the grid waveform of the 240 p.p.m. from 136 causes 141 to oscillate at 80 c.p.m. in square waveform.

The one output of 240 square wave cycles per minute from 136 may also be fed to the grid circuits of the two tubes of a multivibrator 146 through differentiating circuits including a 100 $\mu\mu$f. capacitor 147 and a 91K ohm resistor 148 to provide 240 c.p.m. spiked waveform pulses on the grid voltage waveform of the tubes of 146. The parameters of 146 may be such as to produce a free running flip-flop action slightly less than 60 c.p.m., say 55 c.p.m. The injection on the grid waveform of the 240 c.p.m. spiked waveform pulses from 136 causes each tube of 146 to conduct alternately every second so that at the output 149 and 146 there are provided 60 c.p.m.

The square waveform at 60 c.p.m. from the output 149 of 146 may pass through a differentiating circuit 150 including a 100 $\mu\mu$f. capacitor 151 and 91K ohm resistor 152, the output from 150 being plus and minus spiked waveform pulses which may be fed to a clipper circuit 153 which eliminates the negative pulses and passes along only the positive pulses to an output terminal 154 at the rate of 60 p.p.m.

The 80 c.p.m. in square waveform from the output of 141 may pass through a differentiating circuit 155, producing 80 plus and 80 minus spiked waveform pulses per minute. These may be fed through a clipper 156 which eliminates the negative 80 pulses per minute and passes the 80 positive pulses per minute to a terminal 157.

The 80 plus and 80 minus spiked waveform pulses from circuit 155 may be also fed to a clipper 158 which eliminates the 80 positive pulses per minute and feeds only the 80 negative pulses per minute to the grid circuits of a bistable multivibrator 159. The bistable multivibrator is not free running and only alternates from one of its stable states to its other stable state when a negative pulse is applied to its input.

If tube $T_1$ of 159 is conducting, the grid of $T_2$ is forced to cut off. When a negative pulse from 141 is applied to a capacitor 160 leading to the grid of $T_1$, it makes that grid more negative, causing it to cut off and thereby making the grid of $T_2$ more positive so that $T_2$ begins conducting until the next negative pulse from 141 cuts off $T_2$ and renders $T_1$ conducting. The output from 159 is a 40 c.p.m. square wave which is fed to a clipper 161 which clips the 40 negative half-cycle pulses and permits only the 40 positive half-cycle pulses to flow to a lead 162.

The 40 c.p.m. square wave output of 159 leads also to a bistable multivibrator 163 via a clipper 164 which removes the positive half-cycles and feeds 40 negative c.p.m. to the grids of the tubes of 163 which function identically with those of 159. The 20 c.p.m. square wave voltage output of 163 in turn is clipped by a clipper 165 so that only the 20 positive half-cycle pulses flow to a lead 166.

Likewise, the 20 c.p.m. voltage in square waveform of 163 leads to a clipper 167 which eliminates the 20 positive half-cycle pulses and feeds the 20 negative half-cycle pulses to the grids of the tubes of a bistable multivibrator 168. The 10 c.p.m. square wave voltage output of 168 in turn is clipped by a clipper 169, eliminating the 10 negative half-cycle pulses and supplying the 10 positive half-cycle pulses to a lead 170.

In a like manner, the 10 c.p.m. square wave voltage of 168 leads to a clipper 171 which eliminates the 10 positive half-cycle pulses and feeds the 10 negative half-cycle pulses to the grids of the tubes of a bistable multivibrator 172. The 5 c.p.m. square wave voltage output of 172 in turn is clipped by a clipper 173, eliminating the 5 negative half-cycle pulses, and the 5 positive half-cycle pulses are fed to a lead 174.

The 720 c.p.m. square wave voltage output of 132 leads to a clipper 175 which eliminates the 720 negative half-cycle pulses and supplies 720 positive half-cycle pulses to a lead 176.

From the foregoing it is evident that the terminals 174, 170, 166, 162, 157, 154 and 176 have impressed on them, respectively, 5, 10, 20, 40, 80, 60 and 720 pulses per minute. Leads 174, 170, 166, 162, 157, 154 and 176 may be directly connected to the lines to which brushes 46, 45, 44, 43, 42, 41 and 40, respectively, are connected in FIG. 1.

The arm 53 of stationary disk 52 may be located at a desired position in the same manner that it was employed in the embodiment of FIG. 1. Thus, placing the arm 53 in a rotary position represented by 55' about the periphery of disk 52 will connect through the conductor 65, leads 162, 170 and 174 into the costing section 176' (FIG. 4) of the beam switching and tube readout unit NT (FIGS. 2 and 4). The costing section 176' of unit 104 is a commercial item and is made up of four vacuum beam switching tubes (BD–300), each of which is a ten-position, high vacuum, constant current distributor. They include ten identical "arrays" located radially about a central cathode. Each array comprises (1) a spade which automatically forms and locks the electron beam, (2) a target output which makes the beam available with constant current characteristics, and (3) a high impedance switching grid which serves to switch the beam from target to target. A small cylindrical magnet is permanently attached to the glass envelope to provide a magnetic field which, in conjunction with an applied electric field, comprise the crossed fields necessary for the operation of this tube.

There is a Nixie display tube which is associated with each one of the beam switching tubes BD–300. The Nixie tube is a neon gas filled, cold cathode, ten digit ("0" through "9") numerical indicator tube having a common anode. It is an all-electronic in-line readout device and converts electronic signals directly to readable characters.

The beam switching tube and the Nixie indicator tube form a decade counter which is the counterpart of one number wheel of either of the four decade counters 10 and 11 used for cost and time indication in FIG. 1. The two pairs of four counters forming NT shown in FIG. 4 are interconnected so as to be the exact equivalent of the magnetic counters of FIG. 1.

The costing section 176' of FIG. 4 is the electronic equivalent of the electromechanical costing devices 11, 24 and 25 of FIG. 1, and indicates the accumulation of the cost produced by the combination of different groups of pulses from the pulse producing network of FIG. 3.

The 60 pulses per minute from line 154 flow through line 83 to contacts 78 of switch 76, thence through line 84 to the input of the time section 177 (FIG. 4) of the beam switching and tube readout unit NT. The time section 177 of unit NT is substantially the same as the costing section 176' and indicates the accumulation of the time elapsed incident to the 60 p.p.m. passing through line 84.

Presettable means may be provided in section 177 for rendering the costing section 176' effective only after a predetermined time interval in order to provide the initial predetermined period of conversation at a fixed price. In the embodiment shown in FIG. 4, this means comprises a unique combination of voltages for each individual number represented by the decade counter of unit 177. This combination of voltages can be made to render a relay tube conductive at a predetermined numerical value of elapsed time. In the present embodiment this period is 180 seconds, although it may be preset for any predetermined elapsed time.

When this unique combination of voltages becomes effective, it renders a triode 178 (FIG. 2) conducting, thereby energizing relay 86, causing pulses from the pulse forming network and appearing on arm 53 of disk 52 to flow through line 96 to contacts 91 of relay 86, thence through line 65 to the input of the costing section 176' of unit NT.

At the same time that relay 86 is energized, contacts 92 close, causing high voltage direct current to be applied to the lamp 93 indicating to the user that the three-minute period has elapsed and that overtime charges in cost are being accumulated on the costing section 176' of unit NT.

Upon completion of the conversation, the user may insert a piece of light-sensitive material in juxtaposition relatively to the Nixie tubes to make a permanent record of the accumulated cost and elapsed time.

Thereafter the user closes switch 99 (FIG. 2), causing the high voltage direct current discharge pulse from the condenser of the filter 63 to be applied through line 100 to the reset terminals of both the costing section 176' and the time section 177 of the unit NT, thereby returning all indicators of these sections to zero position, and the apparatus is in condition for its next use.

Although the various features of the new and improved timing and costing device have been shown and described in detail to fully disclose several embodiments of the invention, it will be evident that numerous changes may be made in such details and certain features may be used without others without departing from the principles of the invention.

What is claimed is:

1. A time and costing apparatus comprising in combination; means adapted to indicate a value representing elapsed time; means adapted to indicate a value representing accumulated cost as a function of time; pulse producing means for actuating said time and cost indicating means; means for causing said pulse producing means to actuate said cost indicating means independently of said time indicating means; means for causing said pulse producing means to actuate said time indicating means independently of said cost indicating means; and presettable means, responsive to the operation of said time indicating means, for causing said pulse producing means to actuate both said cost and time indicating means simultaneously.

2. A time and costing apparatus as claimed in claim 1 in which said pulse producing means comprises rotatable electrical pulse producing means.

3. A time and costing apparatus as claimed in claim 1 in which said pulse producing means comprises rotatable means having a plurality of groups of contacts, each group including a different number of contacts; an electrical brush for each group of contacts adapted to complete a circuit each time a contact engages a brush; means for impressing a voltage on all of said contacts; and means for rotating said rotatable means at a constant rate of rotation to produce a plurality of groups of electrical pulses, each group comprising a different number of pulses.

4. A time and costing apparatus as claimed in claim 1 in which said value indicating means representing elapsed time and accumulated cost comprises electromagnetically operated decade counting means.

5. A time and costing apparatus comprising in combination, means adapted to indicate a value representing elapsed time; means adapted to indicate a value representing accumulated cost as a function of time; means for simultaneously producing different rates of pulses; a presettable device for combining selected of said different rates of pulses; means responsive to said selected rates of pulses for actuating said cost indicating means; means for causing said pulse producing means to actuate said cost indicating means independently of said time indicating means; means for causing said pulse producing means to actuate said time indicating means independently of said cost indicating means; and presettable means, responsive to the operation of said time indicating means, for causing said pulse producing means to actuate both said cost and time indicating means simultaneously.

6. A time and costing apparatus as claimed in claim 5 in which said pulse producing means comprises rotatable means having a plurality of groups of contacts, each group including a different number of contacts; an electrical brush for each group of contacts adapted to complete a circuit each time a contact engages a brush; means for impressing a voltage on all of said contacts; and means for rotating said rotatable means at a constant rate of rotation to produce a plurality of groups of electrical pulses, each group comprising a different number of pulses.

7. A time and costing apparatus as claimed in claim 5 in which said pulse producing means comprises rotatable means having a plurality of groups of contacts, each group including a different number of contacts; an electrical brush for each group of contacts adapted to complete a circuit each time a contact engages a brush; means for impressing a voltage on all of said contacts; means for rotating said rotatable means at a constant rate of rotation to produce a plurality of groups of electrical pulses, each group comprising a different number of pulses; stationary means having a plurality of groups of contacts in series with the brushes for the groups of contacts on said rotatable means; and said presettable device comprises means for rendering effective selected of said groups of contacts on said stationary means to thereby combine selected of said groups of pulses.

8. A time and costing apparatus comprising in combination, means adapted to indicate a value representing elapsed time; means adapted to indicate a value representing accumulated cost as a function of time; pulse producing means for actuating said time and cost indicating means; means for causing said pulse producing means to actuate said cost indicating means independently of said time indicating means; means for causing said pulse producing means to actuate said time indicating means independently of said cost indicating means; presettable means, responsive to the operation of said time indicating means, for causing said pulse producing means to actuate both said cost and time indicating means simultaneously; and means for recording the accumulated values on said time and cost indicating means.

9. A time and costing apparatus as claimed in claim 8 in which said pulse producing means comprises rotatable electrical pulse producing means.

10. A time and costing apparatus comprising in combination, means adapted to indicate a value representing elapsed time; means adapted to indicate a value representing accumulated cost as a function of time; means for simultaneously producing different rates of pulses; a presettable device for combining selected of said different rates of pulses; means responsive to said selected rates of pulses for actuating said cost indicating means; means for causing said pulse producing means to actuate said cost indicating means independently of said time indicating means; means for causing said pulse producing means to actuate said time indicating means independently of said cost indicating means; presettable means, responsive to the operation of said time indicating means, for causing said pulse producing means to actuate both said cost and time indicating means simultaneously; and means for recording the accumulated values on said time and cost indicating means.

11. Apparatus comprising in combination, means adapted to indicate the accumulation of a variable; means adapted to indicate the accumulation of another variable as a function of the first variable; a pulse forming network connected to line voltage for producing pulses at a relatively high frequency that are related to the frequency of line voltage; means responsive to said pulses for producing pulses at a substantially lower frequency that are related to the frequency of line voltage; means for dividing said lower frequency pulses into a plurality of groups of pulses having predetermined lower frequencies that are related to the frequency of line voltage; means for causing said pulses to actuate one of said indicating means independently of the other; and presettable means for causing said pulses simultaneously to actuate both said indicating means.

References Cited in the file of this patent

UNITED STATES PATENTS

| | | |
|---|---|---|
| 1,064,998 | Sandell | June 17, 1913 |
| 1,157,625 | Heuser | Oct. 19, 1915 |
| 1,251,644 | Clausen | Jan. 1, 1918 |
| 2,019,902 | Geer et al. | Nov. 5, 1935 |
| 2,073,756 | Osten-Sachen | Mar. 16, 1937 |
| 2,596,164 | Palmer | May 13, 1952 |
| 2,650,757 | Weisinger | Sept. 1, 1953 |
| 2,724,741 | Lomax | Nov. 22, 1955 |
| 2,897,380 | Neitzert | July 28, 1959 |
| 2,911,144 | Lee et al. | Nov. 3, 1959 |

FOREIGN PATENTS

| | | |
|---|---|---|
| 74,937 | Sweden | Aug. 2, 1932 |